United States Patent [19]
Alvarado

[11] Patent Number: 5,149,133
[45] Date of Patent: Sep. 22, 1992

[54] SEAT BELT SYSTEM FOR MOTOR VEHICLE

[76] Inventor: Alfredo Alvarado, 4310 Bayview Drive, Fort Lauderdale, Fla. 33308

[21] Appl. No.: 682,357

[22] Filed: Apr. 9, 1991

[51] Int. Cl.[5] ............................................. B60R 22/06
[52] U.S. Cl. .................................... 280/804; 180/268
[58] Field of Search ................. 280/802, 804; 180/268

[56] References Cited

U.S. PATENT DOCUMENTS

| | | | |
|---|---|---|---|
| 4,189,170 | 2/1980 | Tanaka | 280/802 |
| 4,256,330 | 3/1981 | Geoffrey | 280/802 |
| 4,313,622 | 2/1982 | Susuki et al. | 280/804 |
| 4,364,584 | 12/1982 | Rogers, Jr. et al. | 280/802 |
| 4,486,031 | 12/1984 | Holler et al. | 280/802 |
| 4,722,552 | 2/1988 | Gyoda et al. | 280/802 |
| 4,730,844 | 3/1988 | Patterso | 280/804 |
| 4,781,267 | 11/1988 | Waineo et al. | 180/268 |
| 4,909,539 | 3/1990 | Morner | 280/804 X |
| 5,005,867 | 4/1991 | Sandvik | 280/804 |
| 5,022,677 | 6/1991 | Barbiero | 280/804 X |

FOREIGN PATENT DOCUMENTS 2145022 3/1972 Fed. Rep. of Germany ...... 280/804

OTHER PUBLICATIONS

"AAA World", Jan./Feb. 1989, pp. 10 and 11 describing four general types of passive belt systems.

Primary Examiner—Richard A. Schacher
Attorney, Agent, or Firm—Oltman and Flynn

[57] ABSTRACT

This is a seat belt system for a motor vehicle which has a belt retractor behind the inboard rear corner of the seat, a belt guide next to the inboard side of the head rest, a slip ring on a slide in an upwardly and forwardly inclined guideway in the vehicle door next to that seat, and an anchor next to the inboard side of the seat in front of the belt retractor. The seat belt extends up from the retractor behind the back rest of the seat, slidable through the belt guide at the inboard side of the head rest, downward and laterally outward diagonally across the front of the back rest from the guide to the slide on the door, and slidably through the slip ring on that slide back across the seat to the anchor.

15 Claims, 5 Drawing Sheets

SEAT BELT SYSTEM FOR MOTOR VEHICLE

This invention relates to a unitary shoulder and lap belt system for a motor vehicle, such as a passenger car.

BACKGROUND OF THE INVENTION

Various seat belt systems are shown in prior U.S. patents discussed in detail in the Prior Art Statement filed as part of the present patent application. The primary objective of such prior systems, as well as applicant's system, is to position the shoulder-belt segment for engagement with the upper torso and position the lap belt segment for engagement with the lap of a person when that person enters and sits down in the car. When the door next to that seat is opened, the shoulder and lap segments of the seat belt system are moved to respective positions permitting a person's convenient egress from or entry into the vehicle.

SUMMARY OF THE INVENTION

The present invention relates to a novel and simplified seat belt system which: (1) moves the shoulder and lap belt segments into engagement respectively with the upper torso and lap of a person who has entered and sat down in the vehicle; and (2) moves the shoulder and lap belt segments simultaneously out of the way when the door is opened, thus permitting a person to leave or enter the vehicle without being obstructed by the seat belt system.

In accordance with the present invention, the seat belt system has a single belt extending from a retractor behind the seat up to a guide above the seat on the inboard side of the seat (i.e., the side away from the door), and from that guide down at an angle across the front of the seat's back rest to a slide which is slidably mounted on a door-mounted guideway that is inclined upward and forward, and from that slide back across the front of the seat's back rest to a belt anchor at the inboard side of the seat.

A principal object of this invention is to provide a novel seat belt system for a motor vehicle having shoulder and lap belt segments arranged to move readily between operative and inoperative, out-of-the-way positions.

Another object of this invention is to provide such a seat belt system with a simplified but effective construction and mode of operation which may be either motor-operated and automatic or manually-operated.

Further objects and advantages of this invention will be apparent from the following detailed description of two presently preferred embodiments which are illustrated schematically in the accompanying drawings.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DETAILED DESCRIPTION

Figure 1:
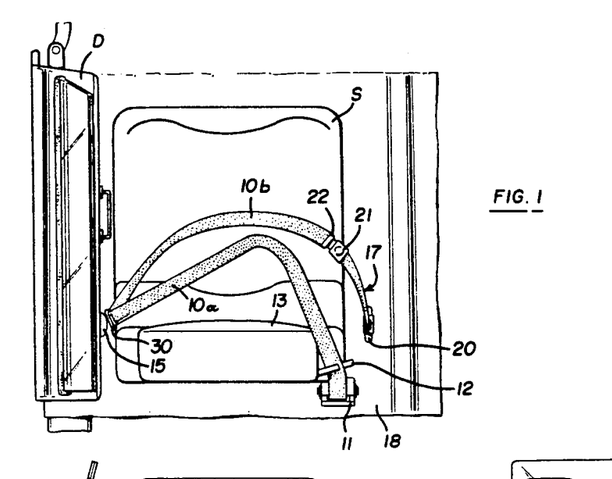
FIG. 1 is a top plan view showing the present seat belt system at the driver's seat of a passenger car when the door is closed.
Figure 2:
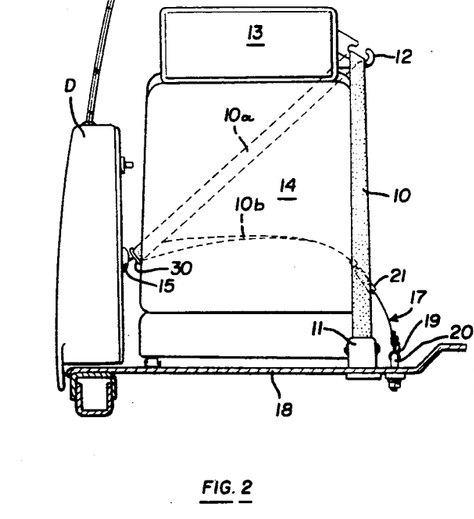
FIG. 2 is an elevation taken from behind this seat in FIG. 1.
Figure 3:
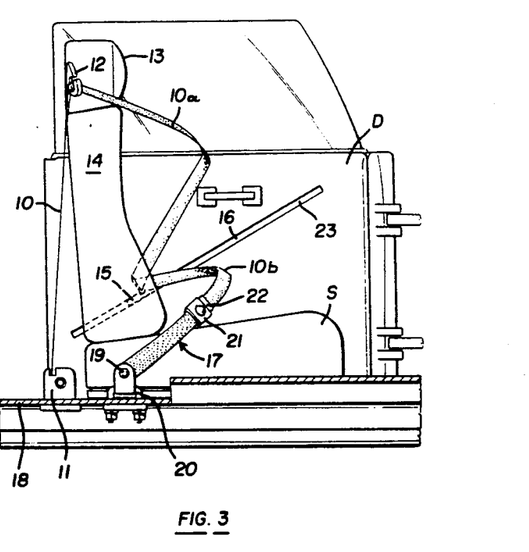
FIG. 3 is a side elevation taken at the inboard side of the seat (i.e., the side away from the door) and looking toward the door when the door is closed.

Referring to FIGS. 1, 2 and 3, in broad outline the seat belt system of the present invention comprises a single flexible belt 10 extending from a belt retractor 11 up to a belt guide 12 next to the head rest 13 at the inboard side of the seat S, and from this guide down at an angle across the front of the back rest 14 of the seat to a slide 15 which is slidably mounted in an upwardly and forwardly inclined guideway 16 (FIG. 3) on the inside of the vehicle door D next to this seat, and from slide 15 back across the front of the back rest 14 to a belt anchor 17 at the inboard side of the seat. Between the guide 12 and the slide 15 the belt 10 provides a shoulder belt segment 10a for engaging the upper torso of a person sitting on the seat. Between the slide 15 and the anchor 17 the belt provides a lap belt segment 10b for engaging the lap of the person on the seat.

The retractor 11 is a vehicle inertia-sensitive type retractor of known design. It is mounted on the vehicle body 18 closely behind the rear inboard corner of the seat, as best seen in FIG. 2.

The belt guide 12 is a generally C-shaped slip ring that is rigidly attached to the frame of the head rest 13 and is located at the inboard side of the head rest above and toward the front of retractor 11, as best seen in FIG. 3.

The anchor 17 is a semi-rigid strap of known design whose lower end is pivoted at 19 to a generally inverted U-shaped anchor bracket 20 bolted to the vehicle body at the inboard side of seat S. A manually operable disconnect buckle 21 on the upper end of anchor strap 17 receives a tongue 22 on the end of the lap belt segment 10b of belt 10 to releasably connect the belt to the anchor. Buckle 21 and tongue 22 are of known design.

FIGS. 1, 2 and 3 show the position of the seat belt when the seat S is unoccupied and the door D is closed.

Figure 4:
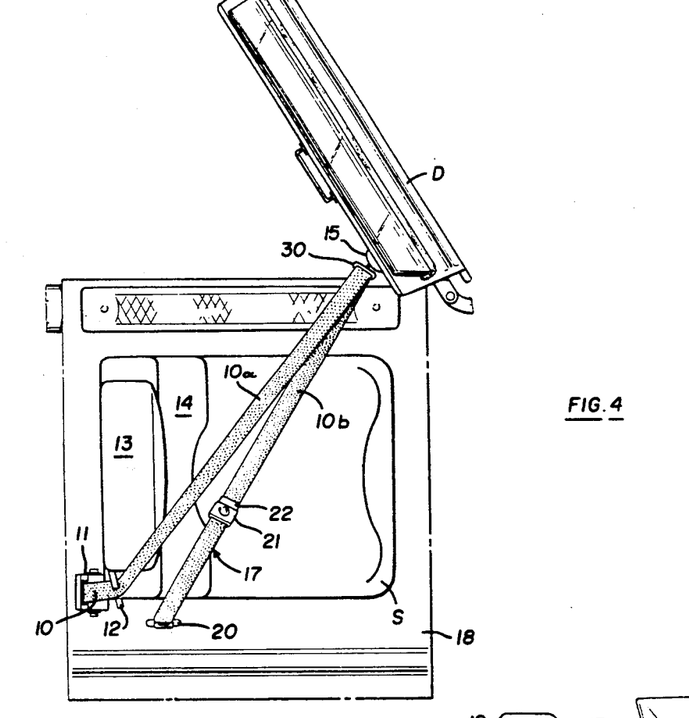
FIG. 4 is a top plan view showing the position of the seat belt system when the door is open.
Figure 5:
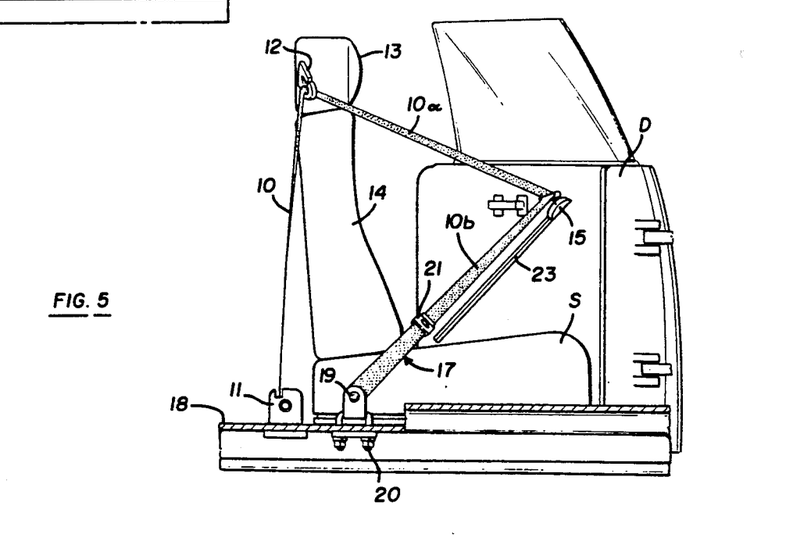
FIG. 5 is a side elevation taken at the inboard side of the seat and looking toward the door when the door is open.

FIGS. 4 and 5 show the position of these parts when the seat is unoccupied and the door D is part-way open.

Figures 6, 7:
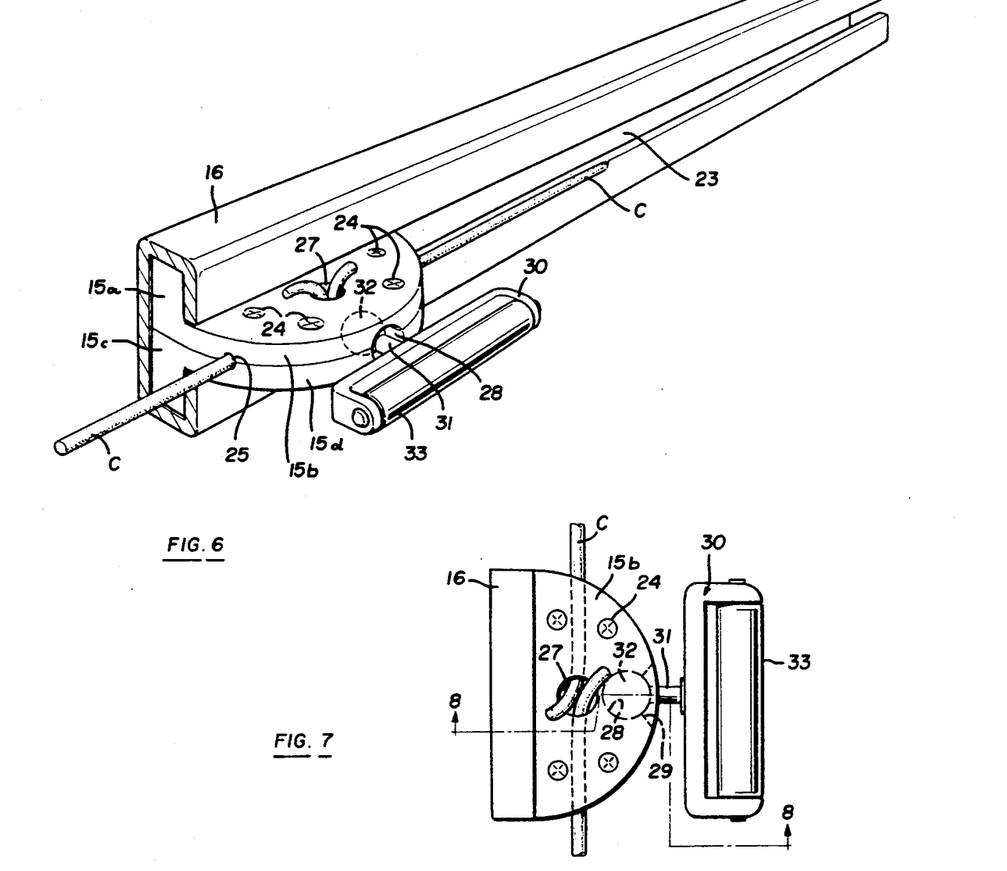
FIG. 6 is a perspective view of the door-mounted slide and its guideway or track in the present seat belt system.
FIG. 7 is a top plan view of this slide.

Referring to FIG. 6, the door-mounted guideway 16 for slide 15 is an elongated channel of rectangular cross-section mounted in the door D and presenting an elongated slot 23 which is open along the inner side of the door. As shown in FIG. 3, slot 23 extends upward and forward along the door at an acute angle to the horizontal. The slide 15 has a two-piece body of generally T-shaped cross-section, made up of an upper body member and a lower body member. The upper body member has a rectangular segment 15a which is slidably received in channel 16 and a semicircular projection 15b which extends perpendicular to segment 15a and passes through the guideway slot 23 and extends slightly inward from the door. The lower body member of the slide is a mirror image of the upper body member, presenting a rectangullar segment 15c slidably received in channel 16 and a semi-circular projection 15d which engages the projection 15b on the upper body member from below. The upper and lower body members of the slide are fastened to each other by screws 24 to form a rigid assembly.

The projection 15b on the upper body member of slide 15 is formed with a downwardly-facing longitudinal groove 25 of semi-circular cross-section which extends parallel to and in front of the slot 23 in guide channel 16. The projection 15d on the lower body member of the slide has a similar upwardly-facing groove 26 which registers with groove 25 so that together they define a recess for tightly receiving the opposite end segments of a cable C, the extremities of which extend up through a central opening 27 in projection 15b on the upper body member of the slide. When the screws 24 are tightened, the cable C is clamped tightly between the upper and lower body members of slide 15.

Laterally inward from cable C the projections 15b and 15d on the upper and lower body members present convex recesses which together form a spherical socket 28 (FIG. 8) which is open at the laterally inboard side of the slide via a frusto-conical recess 29.

Figure 8:
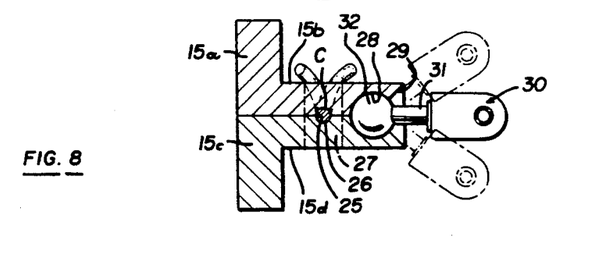
FIG. 8 is a view of the slide taken along the line 8—8 in FIG. 7.

The slide 15 also has a generally D-shaped slip ring (FIG. 7) consisting of a U-shaped body 30 and a cylindrical roller 33 around which the seat belt 10 passes slidably. The body 30 of the slip ring is joined to the inboard end of a rigid stem 31 which carries a cylindrical ball 32 on its outboard end. Ball 32 is snugly but rotatably seated in recess 28 in the slide body and stem 31 is loosely received in the frusto-conical recess 29 in the slide body, as shown in FIG. 8. With this arrangement, the slip ring 30 is swivelled to the slide body.

Figures 9, 11:
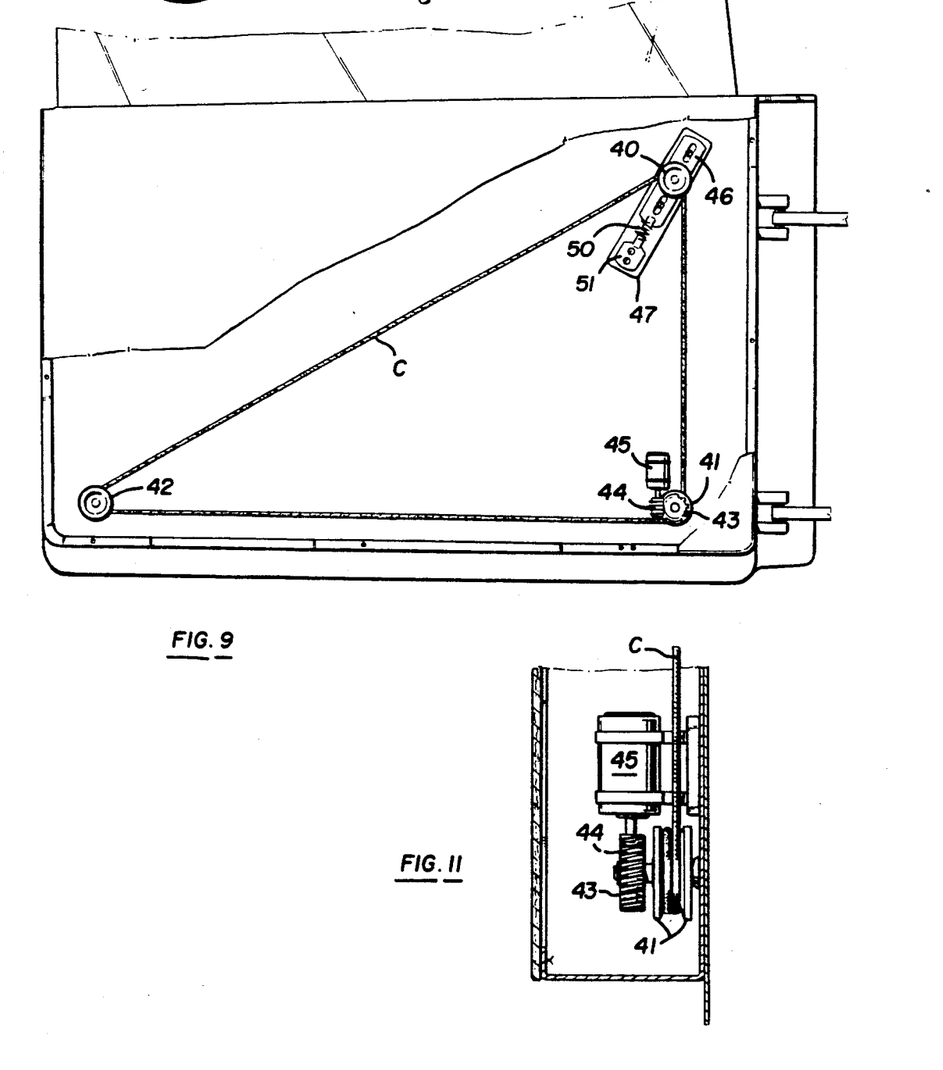
FIG. 9 is a side elevation of the cable mechanism in the door for operating the slide of FIGS. 6, 7 and 8 in a motorized, automatic version of the seat belt system.
FIG. 11 is an end elevation of the motor-driven pulley at the lower right corner of FIG. 9.

FIG. 9 shows the interior of the vehicle door D which holds the guide channel 16 for slide 15 in a motorized, automatic cable-operating first embodiment of this invention. The cable C extends upward and forward from slide 15 to an upper front pulley 40 in the door, then vertically down to a lower front pulley 41 in the door, then horizontally rearward to a rear pulley 42, and from the rear pulley forward and upward to slide 15. (The slide is omitted in FIG. 9 for the sake of simplification.)

As shown in FIGS. 9 and 11, the lower front pulley 41 carries a gear 43 which engages a worm 44 (FIG. 9) driven by a small electric motor 45 fixedly mounted inside the door. The motor 45 is electrically reversible so that it can drive the cable C in either direction. The cable makes 1¼ turns around pulley 41.

Figure 10:
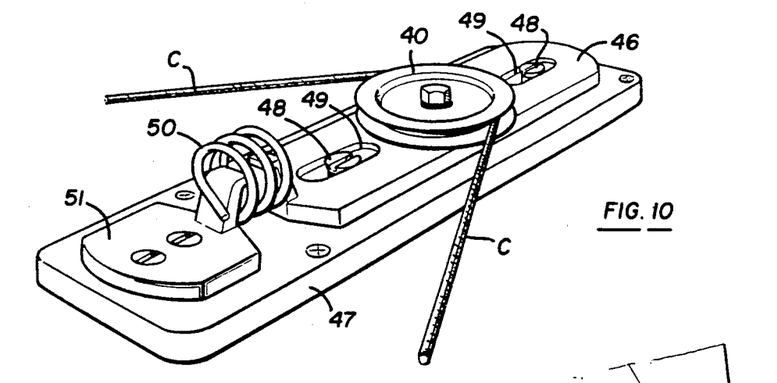
FIG. 10 is a perspective view of the spring-biased pulley at the upper right corner of FIG. 9.

The upper front pulley 40 is rotatably mounted on a plate 46 (FIG. 10) that is slidably adjustable along a base 47 fixedly positioned in the door. Bolts 48 on the base extend through respective elongated slots 49 in plate 46 above and below the upper front pulley 40. A coil spring 50 is under compression between the lower end of plate 46 and a lower plate 51 fixedly attached to base 47. Spring 50 pushes forward and upward on plate 46 to normally maintain a predetermined tension on the cable C.

Figure 12:
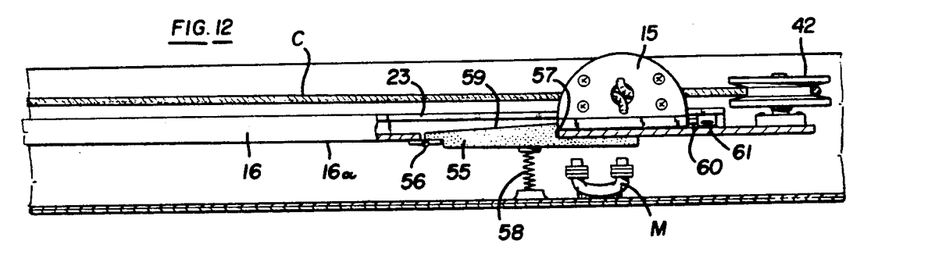
FIG. 12 is a view looking down on the slide in its retracted (door closed) position and showing the electrically releasable lock mechanism holding it in this retracted position.

FIG. 12 shows an electrically-releasable lock mechanism for holding the slide 15 in its fully retracted lowermost position along the guide channel 16 when the door D is closed. This lock mechanism is located a short distance in front of the rear pulley 42 in FIG. 9. The lock mechanism comprises a slide-locking lever 55 which is pivoted at its front end of the laterally outward back wall 16a of guide channel 16, as shown at 56. Away from this pivot the locking lever presents a rearwardly and downwardly facing shoulder 57 which is engageable with the upper front edge of slide 15. A coil spring 58 normally biases lever 55 laterally inward to this slide-engaging position, as shown in FIG. 12.

Lever 55 is of ferromagnetic material so that it moves laterally outward when an electromagnet M is energized. When this happens, the shoulder 57 on the lever no longer blocks the slide 15 and the slide now can move forward and upward along the guide channel 16.

Figure 13:
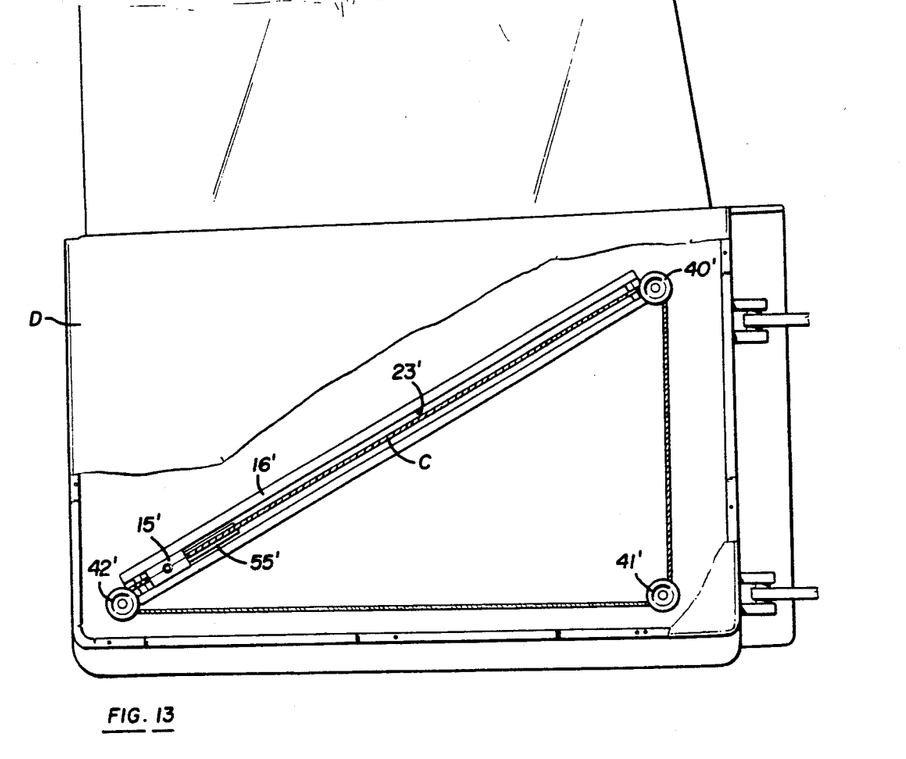
FIG. 13 is a view like FIG. 9 of a second embodiment of the invention in which the cable for the slide is operated manually.

When the electromagnet M is de-energized, the spring 58 moves the locking lever 55 back to its laterally inwardly-projecting, normal position, shown in FIG. 13. Lever 55 presents a sloping face 59 on its laterally inward side (facing into the vehicle) between its pivot 56 and its shoulder 57. This sloping face is inclined laterally inward toward the rear edge of the door and it permits the slide 15 to slide across the locking lever 55 and behind the shoulder 57 when the door D is closed.

A miniature snap-acting electrical switch 60 is positioned by a fixed lower stop element 61 inside the guide channel 16 to be engaged by the lower end of slide 15 when it is in its fully retracted position. Under these conditions, switch 60 maintains the cable drive motor 45 de-energized. An upper stop element in channel 16 (not shown) carries a similar switch that limits the upward/-forward movement of the slide.

FIG. 13 is generally similar to FIG. 9 but it shows a manually-operated arrangement for moving the slide 15 up-and-forward or down-and-rearward. The cable extends up to a fixed upper front pulley 40', vertically down from that pulley to a fixed lower front pulley 41', horizontally rearward from pulley 41' to a fixed rear pulley 42', and from there upward and forward to slide 15.

Figure 14:
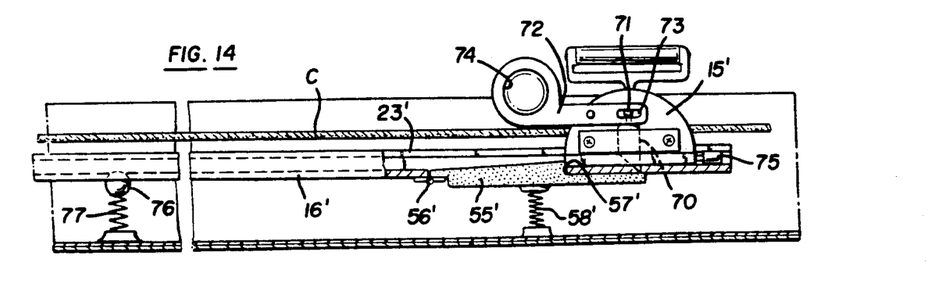
FIG. 14 is a view like FIG. 12 showing the manually releasable lock for the retracted slide in this second embodiment.

FIG. 14 shows a mechanically releasable lock mechanism for the slide 15 in FIG. 13.

The locking lever 55' on the opposite side of its transverse shoulder 57' from the pivot 56' is engaged by a release plunger 70. The opposite end of plunger 70 has a rounded knob 71 which is pivotally coupled to an actuating handle 72 at a recess 73 in that handle. Handle 72 extends forward past the slide 15' and presents a finger opening 74 enabling the driver of the vehicle to rock the handle clockwise in FIG. 14 to push the release plunger laterally outward against the locking lever 55' until it releases the retracted slide 15'. Then the person sitting in the adjacent seat pulls the handle 74 upward and forward to move the slide 15' upward and forward along guide channel 16' in the door.

A lower stop member 75 in channel 16' limits the downward and rearward retraction of slide 15' to the position shown in FIG. 14.

A detent ball 76 projects into the channel 16' under the urging of a coil spring 77. When the slide 15 is moved upward and forward, it rides over this ball, after which the ball snaps into place behind the lower/rear edge of the slide 15 to hold it in the raised position until it is deliberately retracted again by pulling downward and rearward on handle 74.

OPERATION

In both the motor-operated automatic version and the manually operated version, when the vehicle door D is closed and a person is seated on the adjacent seat S, the slide 15 is retracted to the position shown in FIGS. 1, 2 and 3. The slip ring 30 on the slide holds the belt down near the left hip of that person, holding the lap segment 10b of the belt snugly across the person's lap and holding the shoulder segment 10a snugly across the upper torso of the person.

In the motor-operated version, the motor 45 (FIG. 9) drives the cable C in the direction to move slide 15 down to this retracted position automatically in response to closing of the door D. Motor 45 is connected in an electrical control circuit (not shown) of conventional design which causes the energization of the motor in the appropriate direction until the slide 15 engages and operates the lower limit switch 60 to turn off the motor.

In the motor-operated, automatic version of the present seat belt system, when the person on the seat S opens the door D, this operates a switch (not shown) which energizes the electromagnet M to retract the slide-locking lever 55 and energizes the cable drive motor 45 to drive the cable C in the direction for pulling the slide 15 upward and forward along the door-mounted guideway 16 until it operates the upper limit switch (not shown) which turns off the motor 45.

FIGS. 4 and 5 show the positions of the various parts of the seat belt 10 when the door D is fully open. As best seen in FIG. 4, both the shoulder segment 10a and the lap segment 10b of the belt now are pulled forward enough to enable the person to slide off the seat and leave the vehicle without any significant obstruction by the seat belt. As shown in FIG. 5, in this open-door position the slip ring 16 on the slide now is displaced upward and forward to position both the shoulder segment 10a and the lap segment 10b out of the way of the person on the seat S.

In the manually operated version of FIGS. 12 and 14, the operation is similar except that the cable C is not pulled automatically in one direction when the door is closed and in the opposite direction when the door is opened. Instead, when the person enters the car, sits on the seat S and closes the door D, he pulls the handle 72 down past the ball detect 76 wnd down past the locking lever 55' to its retracted position, as shown in FIGS. 1, 2 and 3. When the person wants to leave the car, he operates handle 72, as described, to release the locking lever 55' from slide 15 and pulls the handle and the slide forward and upward along the guideway 16' past the ball detent 76, which releasably holds them in the forward/raised position in which the seat belt is in its extended position as shown in FIGS. 4 and 5. Now the person can open the door and leave the vehicle without obstruction by the seat belt.

From the foregoing description and the accompanying drawings it will be evident that both the motor-operated version and the manually-operated version of this invention cause the shoulder and lap segments of the seat belt to be raised to out-of-the-way positions when the door is open and cause them to be lowered to operative positions respectively engaging the upper torso and lap of the person on the adjacent seat when the door is closed.

While the seat belt system has been disclosed for use with the driver's seat, it is to be understood that it may be used as well at the passenger front seat and at rear seats of the vehicle.

I claim:

1. In a motor vehicle having a door enabling a person to enter and leave the vehicle, and a seat having an outboard side adjacent said door and an inboard side away from said door, said seat having an upwardly extending back rest,
   a seat belt system comprising:
   an elongated guideway on said door;
   a slide slidable along said guideway and having means for slidably receiving a seat belt;
   a belt retractor adjacent the rear of said seat mounted on the vehicle body;
   a belt guide above said retractor near the top of said back rest at said inboard side of said seat rigidly attached to said back rest, said belt guide having means for slidably receiving a belt;
   a belt anchor at said inboard side of the seat;
   and a belt coupled to said retractor and extending up from said retractor to said belt guide, passing slidably through said belt guide across the front of said back rest to said slide to provide a shoulder belt segment for engaging the upper torso of a person sitting on said seat, and extending from said slide across the front of said back rest to said anchor to provide a lap belt segment for engaging the lap of a person on said seat.

2. The combination of claim 1 wherein said belt extends up from said retractor behind said back rest to said belt guide.

3. The combination of claim 2 wherein said retractor is behind said seat at said inboard side of the seat.

4. The combination of claim 1 wherein said retractor is at said inboard side of said seat.

5. The combination of claim 1 and further comprising:
   a manually releasable buckle unit in said seat belt at said inboard side of said seat between said belt and said anchor.

6. The combination of claim 3 and further comprising:
   a manually releasable buckle in said seat belt at said inboard side of said seat between said belt and said anchor.

7. The combination of claim 1 wherein said guideway is inclined upward and forward on said door.

8. The combination of claim 7 wherein said belt extends up from said retractor behind said back rest to said belt guide.

9. The combination of claim 8 wherein said retractor is behind said seat at said inboard side of the seat.

10. The combination of claim 7 wherein said retractor is at said inboard side of said seat.

11. The combination of claim 7 and further comprising:

a manually releasable buckle unit in said seat belt at said inboard side of said seat between said belt and said anchor.

12. The combination of claim 9 and further comprising:
a manually releasable buckle in said seat belt at said inboard side of said seat between said belt and said anchor.

13. The combination of claim 7 and further comprising:
a locking member for holding said slide at the lower end of said guideway.

14. The combination of claim 13 and further comprising:
electrically-operated means for disengaging said locking member from said slide.

15. The combination of claim 13 and further comprising:
manually-operated means for disengaging said locking member from said slide.

* * * * *

UNITED STATES PATENT AND TRADEMARK OFFICE
CERTIFICATE OF CORRECTION

PATENT NO. : 5,149,133
DATED : September 22, 1992
INVENTOR(S) : Alfredo Alvarado It is certified that error appears in the above-identified patent and that said Letters Patent is hereby corrected as shown below:

Column 5, line 52 change "12" to -- 13 --.

Signed and Sealed this

Twenty-third Day of November, 1993

Attest:

BRUCE LEHMAN

Attesting Officer   Commissioner of Patents and Trademarks